Oct. 19, 1943.  J. W. WHITE ET AL  2,332,419
CHARGING DEVICE
Filed Jan. 2, 1940  5 Sheets-Sheet 3

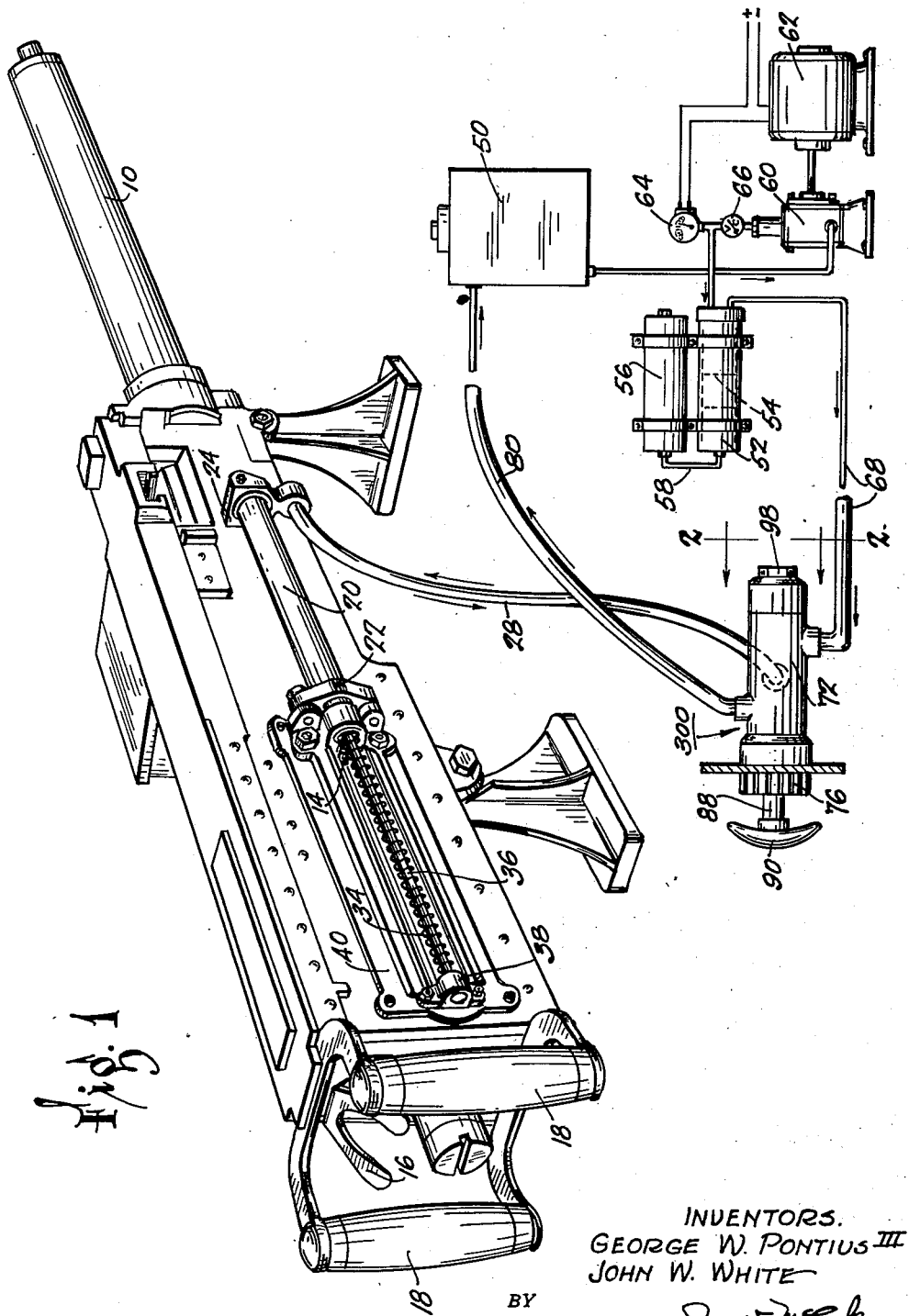

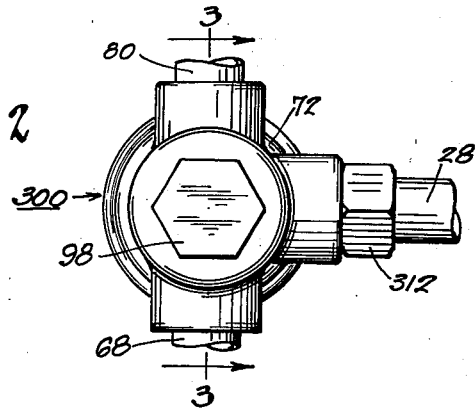
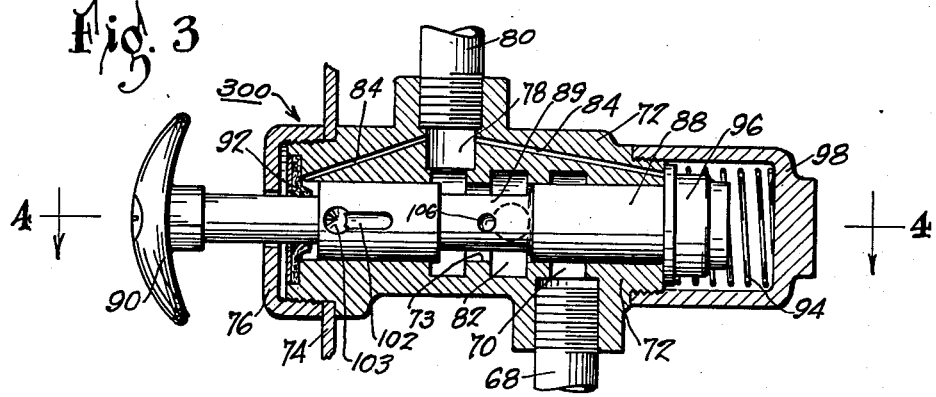
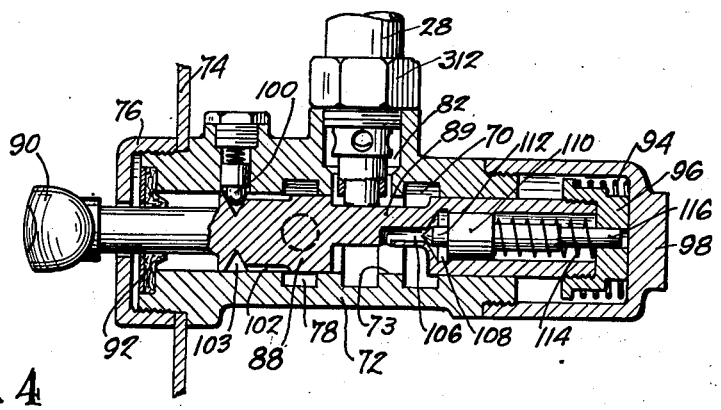

INVENTORS.
GEORGE W. PONTIUS III
JOHN W. WHITE
BY
M. W. McConkey
ATTORNEY.

INVENTORS.
GEORGE W. PONTIUS III
JOHN W. WHITE
BY
*M. W. McConkey*
ATTORNEY.

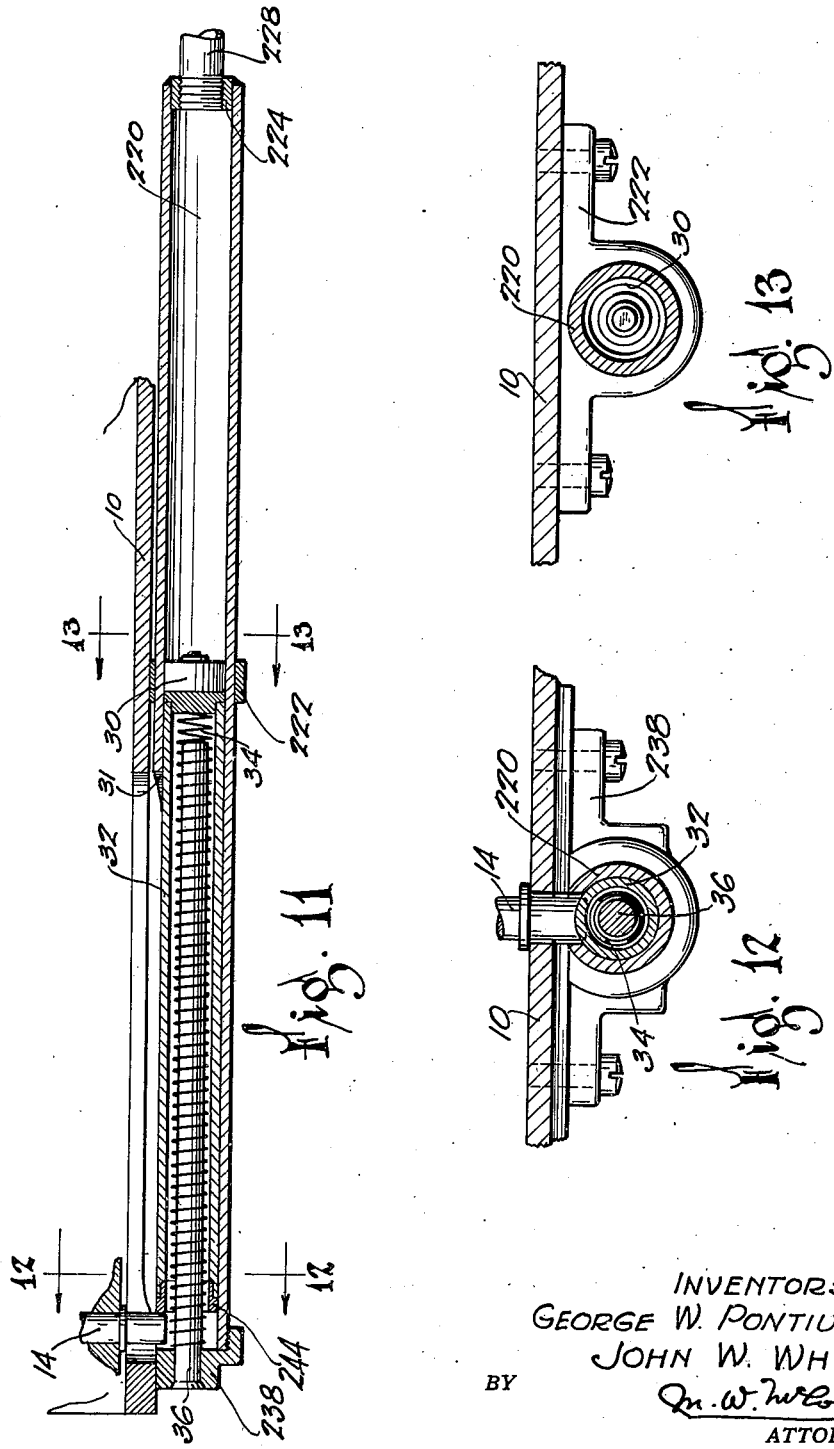

Patented Oct. 19, 1943

2,332,419

UNITED STATES PATENT OFFICE 2,332,419

CHARGING DEVICE

John W. White and George W. Pontius, III, South Bend, Ind., assignors to Bendix Aviation Corporation, South Bend, Ind., a corporation of Delaware Application January 2, 1940, Serial No. 311,978

21 Claims. (Cl. 89—1)

This invention relates to the hydraulic actuation of devices which are remotely controlled, and is illustrated as embodied in a machine gun having a hydraulic charging mechanism controlled by a valve which may, for example, be located within reach of the pilot of an airplane.

An object of the invention is to provide a machine gun with remotely controlled hydraulic power means for operating the charging mechanism to insert the first shell, after which the charging mechanism is operated in the usual manner by the recoil unless a shell fails to fire, in which case the hydraulic means of this invention may again be operated to insert the next shell.

Another object is to provide a simple and reliable hydraulic unit adapted to operate a device such as a gun charger, by acting directly on the breech bolt or other reciprocating part.

Still another object is to provide a simple control valve for operation by the pilot, which will cause the actuated mechanism to operate through a full cycle but which requires from the pilot only a single push to initiate the operation.

A further object is to provide a control valve operable by the pilot, which will automatically trap liquid in a hydraulic mechanism and which can be manually released. An important feature of the invention is to utilize such a valve, or equivalent means, as a safety device for a machine gun having a remote control, to prevent unintended firing.

Another feature of the invention relates to an improved accumulator system forming a source of high-pressure liquid.

The above and other objects and features of the invention will be apparent from the following description of the illustrative embodiments shown in the accompanying drawings, in which:

Figure 1 is a perspective view of a machine gun and the associated hydraulic gun charger mechanism;

Figure 2 is a view on the line 2—2 of Figure 1, showing one end of the control valve;

Figure 3 is a section through the control valve on the line 3—3 of Figure 2;

Figure 4 is a section through the control valve on the line 4—4 of Figure 3;

Figure 11 is a section of a modified construction of the hydraulic unit which operates the breech bolt of the gun;

Figure 12 is a section along the line 12—12 of Figure 11, and

Figure 13 is a section along the line 13—13 of Figure 11.

Figure 5:
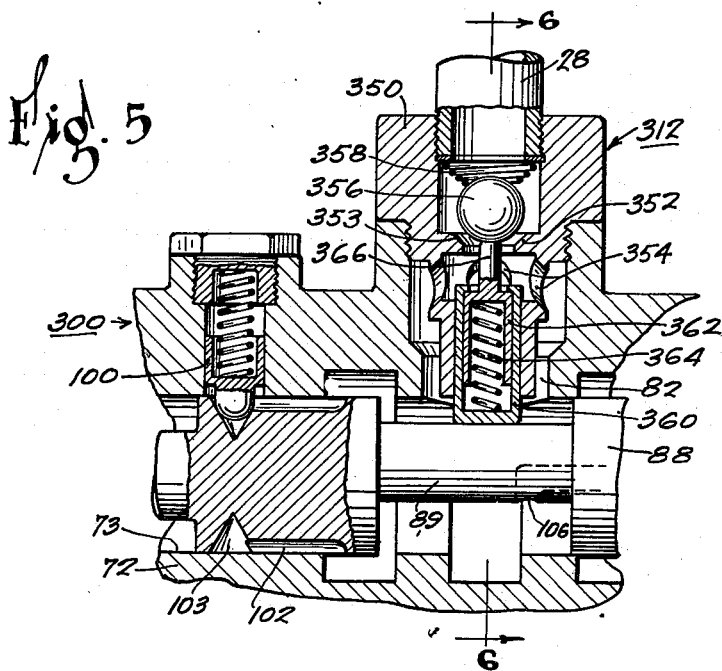
Figure 5 is a detail section of the control valve mechanism showing a check valve in a non-operating position.

A layout of the invention as applied to a machine gun is illustrated in Figure 1. The hydraulic system comprises a source of liquid under pressure, a control valve 300 to regulate the flow, and a hydraulic operating mechanism mounted on a machine gun 10. A conduit 68 connects the source of liquid under pressure to the control valve 300. The liquid passes from the valve 300 to the operating mechanism through conduit 28, which also acts as a return for the spent fluid when the operating pressure is cut off by the valve. The valve 300 passes this return fluid to a reservoir 50 through a conduit 80.

The source of power is shown in Figure 1. In the form illustrated, this source consists of a pump 60 which receives liquid from a reservoir 50, and is driven by an electric motor 62. Liquid is pumped through a check valve 66 to a pressure accumulator comprising a lower cylinder 52 and an upper cylinder 56, interconnected by a tube 58. The lower cylinder 52 contains a piston 54 which separates the liquid from the compressed gas of the upper cylinder, to prevent the gas from being dissolved in the liquid. The upper cylinder is filled with a gas under pressure, so that a liquid in the lower cylinder will at all times be under pressure. The gas is preferably an inert gas such as nitrogen. The electric motor is operated by a pressure responsive switch 64, shown as provided with a pressure indicator. When the pressure in the accumulator cylinders drops, this switch closes the circuit starting the motor and thereby starting the pumping.

The source of fluid pressure may be different from that shown. The electric motor 62 can be replaced by a gas engine or hydraulic motor. The pump may also be driven by the propelling motor of the vehicle in which the invention is installed. Nor need there be an accumulator; there may be a continuously operating pump with pressure maintained in the system by a pressure relief valve that bleeds into the reservoir of the system.

Figure 10:
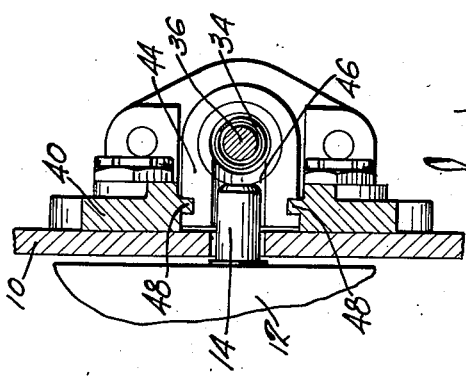
Figure 10 is a partial section transversely of the gun, on the line 10—10 of Figure 9.

The machine gun 10 may be of any standard type, having charging mechanism including a sliding breech block 12 (Figure 10) carrying a reciprocating breech pin 14. Reciprocation of the block 12 and pin 14, either by the gun recoil or by the means described below, ejects the shell which has just been fired, loads the gun with a new shell, and cocks it ready for firing. The gun is fired either electrically by closing a switch adjacent the pilot, or by manually depressing a trigger member 16 between the usual handles 18 at the rear end of the gun.

The hydraulic operating unit, in the form illustrated, includes an elongated cylinder 20 (which may be a section of tubing) hydrogen brazed or otherwise secured at its ends to brackets 22 and 24 mounted on the side of the gun casing. The bracket 24 forms a closure cap for the forward end of the cylinder, and is provided with a passage 26 communicating with a conduit 28 leading to the control valve described below.

Inside the cylinder 20 is a piston 30, faced with suitable packing material, which has secured thereto a relatively long hollow cylinder or skirt 32 adapted to receive a coil return spring 34 guided by a pilot rod 36 projecting forwardly from a bracket 38 mounted on one end of a base plate 40 bolted to the side wall of the gun casing and to the rear face of bracket 22. Suitable packing 42 clamped between the base plate 40 and the bracket 22 wipes against the exterior of the piston skirt 32.

The rear end of the piston skirt 32 has hydrogen brazed or otherwise secured thereto a thrust block 44 having a groove 46 (Figure 10) engageable with the forward side of the breech pin 14, and having guide grooves slidably embracing parallel ribs 48 formed on the base plate 40.

Figures 6, 7:
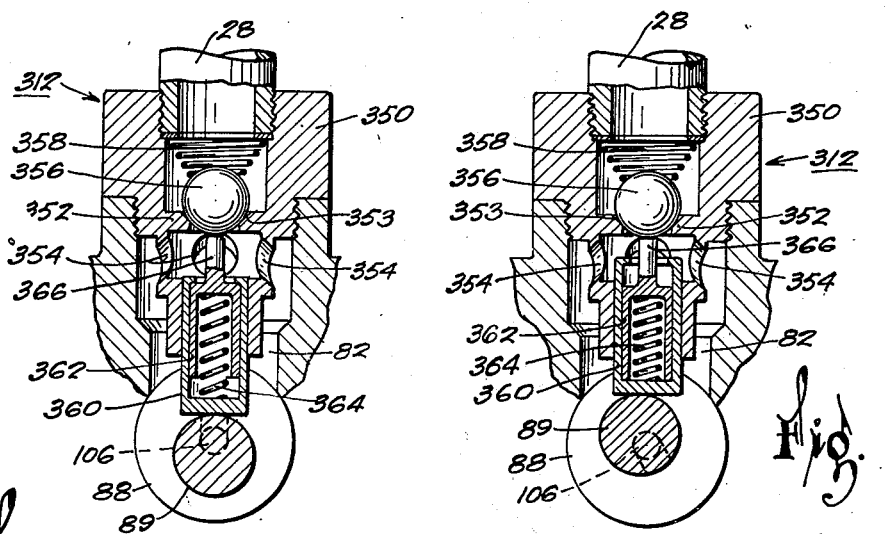
Figure 6 is a sectional view of the check valve in its valve seat along the line 6—6 of Figure 5.
Figure 7 is another view of the valve showing its operating mechanism about to unseat the valve.
Figure 8:
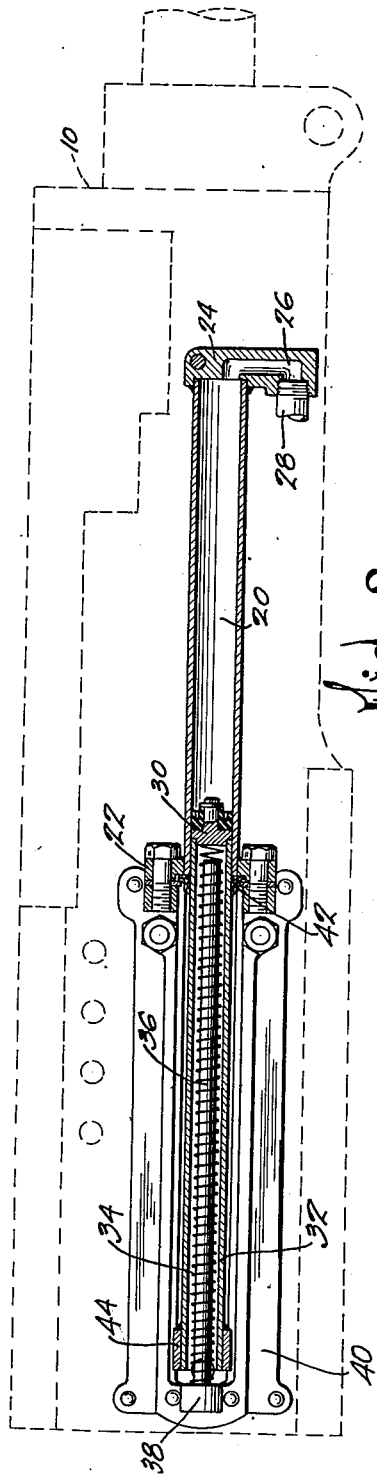
Figure 8 is a longitudinal section paralleling the gun axis, through the hydraulic unit which operates the breech bolt of the gun.
Figure 9:
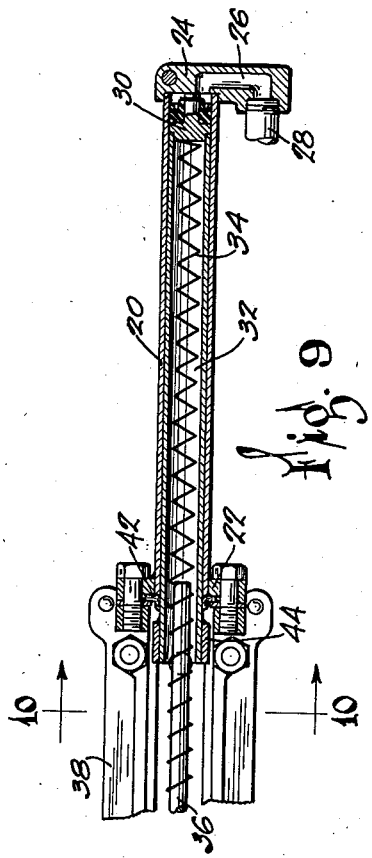
Figure 9 is a view corresponding to part of Figure 8, but with some of the parts in different positions.

It will be seen that fluid pressure from the line 28 acts on piston 30 and through block 44 to force the breech pin 14 rearwardly until it reaches the position where the gun is cocked and reloaded, and that when the pressure is relieved the spring 34 acts on the piston 30 to return it to its initial forward position, as shown in Figure 6. During firing this spring 34 keeps the hydraulic mechanism telescoped as shown in Figure 1 and out of the travel of the pin 14 on the reciprocating breech bolt 12.

The modification of the hydraulic cylinder and piston shown in Figures 11, 12 and 13 differs from that of the other figures in that the base plate is not included. In the modification the cylinder 220 extends the full length of the mechanism, giving the necessary rigidity. The cylinder 220 is closed on its forward end by a member 224 which receives the fluid tube 228. The rear end of the cylinder 220 is closed by a member 238 which retains the usual pilot rod 36 for the spring 34 and acts as a bracket to fasten the rear end to the gun 10. Another bracket 222 at the midsection of the cylinder 220 acts to fasten it to the gun at a second point.

The piston 30 of the modified form is similar to that of the other illustrations with the exception of the guided head 44 shown in the other figures. In the modification, the head 244 is merely a hardened ring secured to the piston skirt 32. The pin 14 on the breech bolt 12 contacts the piston 32 through a longitudinal slot 31 in the cylinder 220. The construction of this modified form saves much weight over the other embodiment, and therefore is especially important on aircraft.

The valve unit 300 consists of a casing 72 having three tube openings or ports, being port 70 to receive conduit 68, 82 to receive tube 28, and 78 to receive tube 80. All of these openings freely communicate with the interior of the casing except 82, which has a check valve unit 312 to prevent at times backward flow into the casing.

The casing 72 has a cylindrical bore 73 passing through it along its longitudinal axis, which has circumferential recesses at each port opening in the casing. This cylindrical bore is adapted to receive a cylindrical valve member 88, which is adapted to rotate and slide in the bore. This valve member contains two detent ways 102 on one end, spaced 180° apart, which detent ways are deeper at their exterior end as at 103. These detent ways engage the spring biased detent 100, which is in the longitudinal plane of port 82. On the same end of the valve member is a handle 90 for rotating and sliding the valve member.

The mid-section of the valve member 88 is reduced in size and is cylindrical, but off center to form a cam 89 in the axial plane of the detent ways 102. The cam is used to operate a mechanism to unseat at times the check valve of unit 312 in the port opening 82, and thereby allow return flow of spent fluid from charger operating mechanism.

The other end of the valve member 88 extends beyond the casing and contains a bore 108. A passage 106 connects with this bore and opens at the cam section of the valve member 88. The bore 108 retains a piston 110 with a pointed head or valve 112, adapted to seat against the opening of the passage 106 as a valve seat. The piston contains an extension or pilot 116 around which is a spring 114. A cap 96 closes the bore, but has a hole therethrough in which the extension 116 of the piston can slide. The spring 114 holds the pointed head 112 on the piston against its seat.

The whole end of the valve casing 72 is capped by a member 98 which retains a spring 94 which biases the whole valve member 88 toward the opposite end of the casing. The handle end of the casing is closed by a packing gland 76 which may clamp the valve unit to a support such as the instrument board 74 and which holds packing 92 against the joint of the valve member 88 in the casing. Passages 84 connect either end of the casing to the reservoir line 80, to allow escape of leakage liquid.

The check valve unit 312, and the mechanism which operates it, is shown in detail in Figures 5, 6 and 7. A fitting 350 is screwed into the port 82. This fitting contains a central passage with a restricted portion 352 near the middle of its length, which forms a valve seat 353, and has ports 354 opening from the passage adjacent thereto. The upper portion of the fitting is adapted to receive conduit 28, which when screwed in place holds a valve ball 356 and spring 358 in position against the valve seat 353, to form a check valve.

The lower portion of the fitting retains a cylinder 360 closed on the lower end, and capable of being moved in the lower part of the fitting. The cylinder 360 retains a cup shaped piston 362 with relatively long skirts. A spring 364 retained between the cylinder and the piston urges the piston upward, and cylinder 360 is peened on its end to prevent escape of the piston. The piston contains a head 366 which is used to contact the ball.

When it is desired to lift the check ball 356 off its seat (shown seated in Figure 5), the valve member handle 90 is turned 180°. This causes the cam 89 to act upon the bottom of cylinder 360, which rises, compressing spring 364. When the 180° turn is nearly complete, as shown in Figure 7, the skirt of the piston 362 touches the bottom of cylinder 360 and a solid connection is made between the valve ball 356 and the cam 89. Turning the valve member the few remaining degrees cracks the valve, and fluid passes by the seat, placing the valve in hydraulic equilibrium. Because of this equilibrium, the spring 364 can now act to push the ball 356 against the relatively weak spring 358, to obtain a large valve opening. This large valve opening is necessary to pass liquid quickly and to allow the gun bolt to slam into position rather than move slowly, in which case it would not reach firing position. The detent 100 acting in detent way 102 prevents rotating the cam 89 beyond its maximum position.

The operation is as follows: Assume that the gun 10 is mounted in the wing of an airplane and that the valve unit 300 is in the pilot's cockpit and that the gun has been firing with the hydraulic charging mechanism in its withdrawn position. The valve during this stage is shown in Figure 3. The valve member 88 is in its neutral position, thrown to the left. In this position port 70, which connects to the source of fluid pressure, is closed off.

If the gun now fails to fire due to a dud, and the pilot wishes to eject the dud and put in a fresh shell, he strikes the handle 90 a blow with his hand, which pushes the valve member 88 inward until it is locked by detent 100 in the deep portion 103 of the detent way. The valve in this position is shown in Figure 4.

Port 70 now communicates with port 82, and high pressure fluid flows through the ports 354 of fitting 350 (Figure 5), through the check valve unit 312 and into the feed line 28 to the actuating mechanism on the gun. Piston 30 is now forced toward the rear of the gun carrying with it the breech bolt 12 through pin 14. Upon reaching the end of the stroke, or if the gun is jammed in an intermediate position, the full force of the fluid pressure builds up in the line and in the valve. Fluid pressure then acts through the small passage 106 upon the valve pin 112 and cracks the valve. Fluid now flows into bore 108, forcing piston 110 outwardly, where it soon strikes the end member 98. The pressure continuing, a reactive force builds up overcoming the hold of the detent in the deep port 103 of the detent way, spring 94 immediately forcing the valve member 88 to the left. This movement closes off the port 70 to the high pressure source. The conduit 28 is now connected in the valve with return conduit 80. The check valve unit 312 being open, the piston 30 returns to its original position, forcing the spent fluid back through 28, from whence it passes through tube 80 to the fluid reservoir. In this manner the dud is ejected and a new shell replaced and the gun is ready again for firing.

When it is desired to cease combat and return the airplane to the ground it is necessary that the guns be placed in a safety condition, so that an accidental touching of the trigger mechanism will not fire the gun and work unwanted damage.

According to one feature of this invention, this result may be obtained by holding the breech bolt in its retracted position by means of the hydraulic mechanism. The first step to effect this is to turn the handle 90 through 180° from the firing position to the safety position, where it is held by the detent 100 from further rotation. This turning causes the cam action of part 89 to effect the operation of the check valve 312, changing it from the firing position shown in Figure 5, to the safety position shown in Figure 6, wherein the check valve is operative.

The second step to secure the safety effect, after the pilot has turned the valve to the safety position, is to strike or push the handle 90, which causes the detent 100 to lock the valve member 88 in its inward position. Fluid flows from port 70 to port 82, overcomes the check valve spring 358 and flows through passage 28 to the charging mechanism. When the charging mechanism has reached the end of its stroke, the back pressure builds up and the valve member 88 is kicked to the left as before. Port 78 is now connected with the reservoir line 80, but no liquid will flow because the check valve holds it in the actuating mechanism. If the pilot should now accidentally touch the trigger mechanism the gun would not fire because the breech bolt is not in place.

To secure release of the safety position, the pilot merely turns the handle 90 through 180° to the firing position. The cam 89 acts through the check valve mechanism to unseat the check valve ball 356. The breech spring returns the actuating mechanism to its telescoped position, the fluid flows out past the check valve to the reservoir 50, and the breech bolt slams tight. If the pilot should now touch the trigger mechanism, the gun would fire.

It will be noted that the handle 90 is turned only when the valve member 88 is to the left. In this position the detent 100 is in the shallow part of the detent way where there is no substantial resistance to the turning movement. If it were attempted to turn the valve while in its inward position, the resistance to the deep part of the detent mechanism would have to be overcome, and the turning could not be done before the valve member 88 would kick back out.

Although this hydraulic system has been described in conjunction with two embodiments of the actuating mechanism and one valve unit and one source of fluid under pressure, it is not limited to apparatus constructed exactly in accordance with such description. The charging mechanism may be varied. The valve could be broken down into separate units for its various functions, or otherwise changed. And the pressure creating system could be greatly varied. Due to these facts, the invention is not limited to the embodiments shown or described, nor otherwise limited except by the terms of the following claims.

We claim:

1. Mechanism of the type described, for operating the slide block of a machine gun or the like, comprising an elongated cylinder constructed and arranged to be mounted adjacent said block, a piston in said cylinder having an elongated hollow skirt and which is engageable with said block to operate it, a return spring extending within the skirt of said piston, a source of fluid under a pressure greater than that required to move the piston against the resistance of said block and said spring, connections from said source to said cylinder, and a valve in said connections having a part which is manually movable from its normal position to admit fluid from said source to said cylinder, means for holding said part in the position to which it is moved manually so long as the piston is moving, means to release said last means by the full pressure of the fluid from said source acting directly on said part and becoming effective when the piston stops moving to return said part to its normal position.

2. Mechanism of the type described, for operating the slide block of a machine gun or the like, comprising an elongated cylinder constructed and arranged to be mounted adjacent said block, a piston in said cylinder having means engageable with said block to operate it, a return spring for said piston, a source of fluid under a pressure greater than that required to move the piston against the resistance of said block and said spring, connections from said source to said cylinder, and a valve in said connections having a part which is manually movable to admit fluid from said source to said cylinder, means for holding said part in the position to which it is moved manually so long as the piston is moving, and means operated by the full pressure of the fluid from said source which is effective when the piston stops moving, for releasing said holding means said part having fluid actuated means for shifting said part to a position to exhaust said cylinder when the holding means is so released.

3. Mechanism of the type described, for operating the slide block of a machine gun or the like, comprising an elongated cylinder constructed and arranged to be mounted adjacent said block, a piston in said cylinder having an elongated hollow skirt and which is engageable with said block to operate it, a return spring extending within the skirt of said piston, a source of fluid under a pressure greater than that required to move the piston against the resistance of said block and said spring, connections from said source to said cylinder, a manually operable valve in said connections to admit fluid from said source to said cylinder, and automatically operable means in said valve to cut off the flow of fluid from said source and to exhaust said cylinder when the piston reaches the end of its stroke.

4. Mechanism of the type described, for operating the slide block of a machine gun or the like, comprising an elongated cylinder constructed and arranged to be mounted adjacent said block, a piston in said cylinder having means engageable with said block to operate it, a return spring for said piston, a source of fluid under a pressure greater than that required to move the piston against the resistance of said block and said spring, connections from said source to said cylinder, and a manually operable valve in said connections to admit fluid from said source to said cylinder, and automatically operable means in said valve to exhaust said cylinder when the piston reaches the end of its stroke, said means comprising a needle valve normally spring biased to closed position and adapted to respond to increase in fluid pressure above a predetermined value after the piston within the cylinder has reached the end of its stroke.

5. A remote control valve comprising a casing having an inlet from a source of fluid power and having operating and exhaust outlets, a plunger movable to connect either the inlet or the exhaust outlet to the operating outlet, a spring urging the plunger to a position to connect the exhaust outlet to the operating outlet and to close the inlet, detent holding means for releasably holding the plunger in the open position connecting the inlet to the operating outlet, and automatic power means within said plunger for overcoming said holding means to permit the valve to close upon increase of the pressure of the fluid within the casing above a predetermined pressure.

6. A remote control valve comprising a casing having an inlet from a source of fluid power and having operating and exhaust outlets, a plunger movable to connect either the inlet or the exhaust outlet to the operating outlet, a spring urging the plunger to the position connecting the exhaust outlet to the operating outlet to close the valve, holding means for releasably holding the plunger in the open position connecting the inlet to the operating outlet, and automatic power means within said plunger for overcoming said holding means to permit the valve to close upon increase of the pressure of the fluid within the casing above a predetermined pressure, said means including a valve unseated by said increase of pressure to cause the fluid at its increased pressure to force said plunger in a direction to release the holding means.

7. Mechanism adapted for hydraulic actuation comprising a hydraulic operating mechanism, a reservoir of liquid, a control valve, an accumulator connected to said mechanism through said control valve, said valve having an exhaust position connecting the mechanism to said reservoir, and an automatically controlled pump for forcing liquid from the reservoir into the accumulator against a yielding gaseous pressure therein, to maintain the pressure in the accumulator, said accumulator including connected closed cylinders one of which contains gas under pressure and the other of which contains a floating piston forced back against the pressure of the gas by the liquid forced against its face by said pump.

8. In a hydraulically operated machine gun charging mechanism, a control valve mechanism comprising a casing containing longitudinally spaced inlet and outlet and exhaust fluid ports, a valve operating member slidable and rotatable in said casing, said member containing a reduced, off-center mid-section which allows two ports to communicate, a check valve in the outlet port preventing the return of outgoing fluid, a a member placed between the check valve and the off-center portion of the valve member and which is operable to unseat the check valve when the valve member is operated.

9. A control valve for fluid actuating mechanisms, comprising a casing containing longitudinally spaced inlet and outlet and exhaust fluid ports, a valve operating member slidable and rotatable in said casing, said member containing a reduced, off-center mid-section which allows two ports to communicate, a check valve in the outlet port preventing the return of outgoing fluid, and a member placed between the check valve and the off-center portion of the valve member and which is operable to unseat the check valve when the valve member is rotated.

10. A control valve for fluid actuating mechanisms, comprising a casing containing longitudinally spaced inlet and outlet and exhaust fluid ports, a valve operating member slidable and rotatable in said casing, said member containing a reduced, off-center mid-section which allows two ports to communicate, a check valve in the outlet port preventing the return of outgoing fluid, a member placed between the check valve and the off-center portion of the valve member and which is operable to unseat the check valve when the valve member is rotated, and means automatically operable upon a predetermined fluid pressure to slide the valve member to cover the inlet port and to cause communication between the outlet and the exhaust fluid port.

11. A control valve for fluid actuating mechanisms, comprising a casing containing longitudinally spaced inlet and outlet and exhaust fluid ports, a spring biased detent on the inside of said casing, a valve operating member slidable and rotatable in said casing, said member containing a reduced, off-center mid-section which allows two ports to communicate, said member also containing a longitudinal groove adapted to contact the detent, said groove being so placed with relation to the off-center portion of the valve member that when contacted by the detent, the off-center portion has a maximum throw in the axial plane of the outlet port, a check valve in the outlet port preventing the return of outgoing fluid, a member placed between the check valve and the off-center portion of the valve member and which is operable to unseat the check valve, and means automatically operable upon a predetermined fluid pressure to slide the valve member to cover the inlet port, and communicate the outlet and the exhaust fluid port.

12. A kick off member to unseat a check type valve, comprising an exterior cylinder closed on one end, a telescoping cylinder piston substantially the length of the exterior cylinder, and a spring retained between the piston and the cylinder, one cylinder member adapted to contact the check valve member and the other member adapted to contact an unseating mechanism.

13. A machine gun having a hydraulic charging mechanism, a control valve for causing said mechanism to operate, a safety device preventing firing of the machine gun by trapping liquid in the mechanism and thereby preventing the completion of the charging operation by said mechanism, said safety device comprising a check valve in the control valve.

14. A machine gun having a hydraulic charging mechanism, a control valve for causing said mechanism to operate, and a safety device preventing firing of the machine gun by trapping liquid in the mechanism and thereby preventing the completion of the charging operation by said mechanism, said safety device comprising a check valve in the control valve, said control valve having means for unseating the check valve to permit the charging mechanism to operate and for permitting the check valve to seat to prevent unintended firing of the machine gun.

15. A gun having a reciprocable breech bolt member for reloading the gun, a hydraulic motor attached to said gun and adapted to reciprocate the breech bolt member, means to retain said breech bolt member in a retracted position, manual control means for starting said motor, and automatic control means responsive to hydraulic pressure in said manual control means to exhaust the motor at the termination of the reloading operation of said hydraulic motor.

16. A gun having a reciprocable breech bolt member for loading, a source of hydraulic pressure fluid, a hydraulic motor attached to said gun for reciprocating said breech bolt, means associated with said hydraulic motor to retain said breech bolt in a retracted position, conducting means connecting said fluid source to said motor including a manual valve for starting said hydraulic motor, said valve including automatic means responsive to the pressure of the hydraulic fluid for operating the valve to exhaust the hydraulic motor.

17. The combination of a gun having a reciprocable member for reloading the gun, a hydraulic motor for reciprocating said member, a control for said motor, and means in said control to trap hydraulic liquid in said motor to hold the member in a retracted position.

18. The combination of a hydraulic charging motor, a control valve for admitting fluid to said motor, a connection from said valve to said motor, a check valve in said connection to hold fluid in the motor, and manual means to render the check valve inoperative.

19. The combination of a gun having a reciprocable breech bolt member for re-loading the gun, a source of hydraulic pressure fluid, a hydraulic motor attached to said gun and adapted to retract said breech bolt member for countermovement and a control intermediate said source and the hydraulic motor operable to pass fluid to said motor to effect a retracting operation, said control including means responsive to the pressure of the hydraulic fluid for operating said control to exhaust the hydraulic motor at the end of said retracting operation, and a further means associated with said control to prevent exhausting said hydraulic motor at the end of said retracting operation.

20. The combination of a gun having a re-loading mechanism, a source of hydraulic pressure fluid, a hydraulic motor attached to the gun and adapted to actuate the re-loading mechanism, and a control intermediate the motor and the source of hydraulic pressure fluid for controlling the admission of fluid to the motor upon failure of the re-loading mechanism to operate, said control including means responsive to pressure of the hydraulic fluid for operating said control to exhaust the hydraulic motor at the end of the retractive portion of said re-loading operation, and a further means associated with said control to prevent exhausting said hydraulic motor at the end of said retracting operation.

21. The combination of a gun having a breech block reciprocable during normal gun operation, a breech pin secured thereto, a source of hydraulic pressure fluid, a hydraulic motor attached to said gun and adapted to retract the breech pin with said breech block for countermovement, and a control intermediate said source and the hydraulic motor operable to pass fluid to said motor to effect a retracting operation, said control including means responsive to pressure of the hydraulic fluid for operating said control to exhaust the hydraulic motor at the end of the retracting operation, and a further means associated with said control to prevent exhausting said hydraulic motor at the end of said retracting operation.

JOHN W. WHITE.
GEORGE W. PONTIUS, III.